United States Patent

[11] 3,588,136

[72] Inventor  Francis Edward Schlueter
      Des Moines, Iowa
[21] Appl. No  857,785
[22] Filed     Sept. 15, 1969
[45] Patented  June 28, 1971
[73] Assignee  Deere & Company
      Moline, Ill.

[54] VEHICLE-MOUNTED RECEPTACLE
     10 Claims, 3 Drawing Figs.
[52] U.S. Cl.................................................. 280/5A,
                                                             280/164
[51] Int. Cl................................................. B60p 3/22
[50] Field of Search......................................... 280/5 (R),
                                               5 (A), 164; 239/127

[56]        References Cited
         UNITED STATES PATENTS

| | | | |
|---|---|---|---|
| 2,946,598 | 7/1960 | Foster | 280/5R |
| 2,978,185 | 4/1961 | Pearch | 239/127X |
| 2,985,379 | 5/1961 | Strickland | 239/127 |
| 3,394,772 | 7/1968 | Abold | 280/5A |

*Primary Examiner*—Leo Friaglia
*Attorneys*—H. Vincent Harsha, Harold M. Knoth, William A. Murray, John M. Nolan and Raymond L. Hollister

ABSTRACT: A vehicle-mounted receptacle including cooperative fore-and-aft guide and support means enabling lengthwise sliding installation of the receptacle and operator-mountable step means including mounting means blocking lengthwise removal of the receptacle.

PATENTED JUN28 1971

3,588,136

*INVENTOR.*
FRANCIS EDWARD SCHLUETER

VEHICLE-MOUNTED RECEPTACLE

BACKGROUND OF THE INVENTION

This invention relates to and is especially useful in self-propelled vehicles of the type constructed for operation in fields of growing row crops where the frame is elevated so as to clear the crops and a tank or receptacle is carried by the vehicle for containing a liquid for treating the crops or the soil in which the crops are growing. One problem encountered in vehicles of this type has been in the mounting of the tank for easy installation and removal.

SUMMARY OF THE INVENTION

According to the present invention, the vehicle is provided with an elevated frame including a pair of transversely spaced-apart side members between which the tank or receptacle may be suspended after being mountable by means providing for lengthwise installation thereof, together with an operator-mountable step means which has mounting means functioning also to secure the tank in place, thus affording a simple and economical construction that permits easy assembly and disassembly.

BRIEF DESCRIPTION OF THE DRAWINGS

FIG. 1 is an elevation of a typical vehicle of the class referred to;

DESCRIPTION OF A PREFERRED EMBODIMENT

Figure 1:
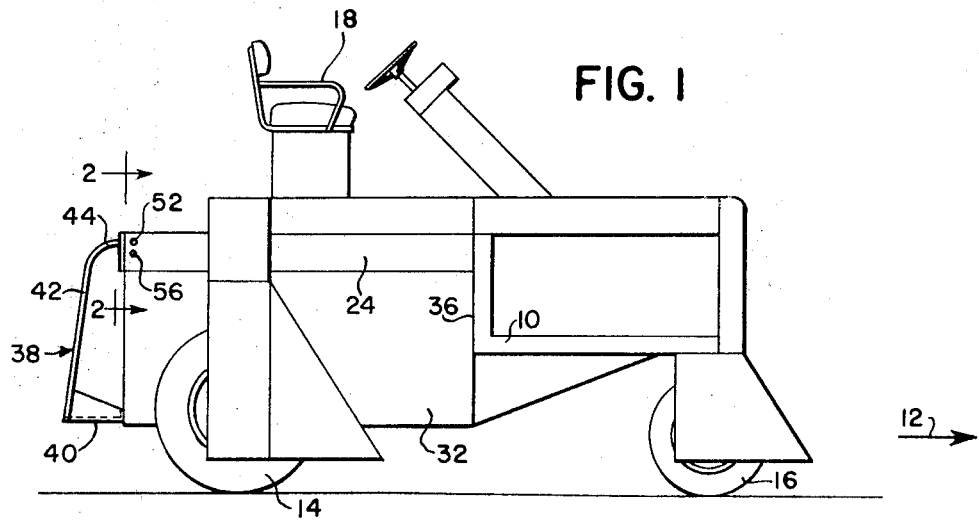
Figure 2:
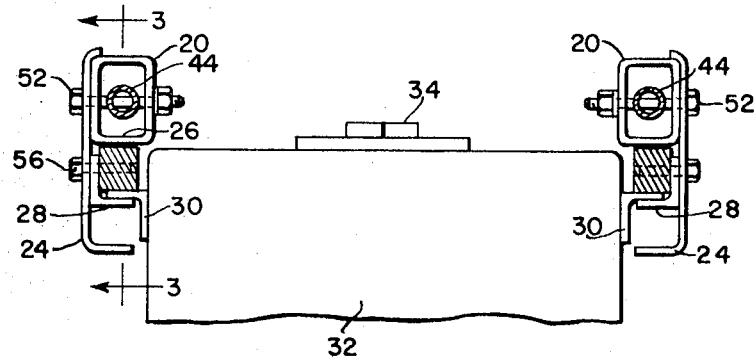
FIG. 2 is an enlarged fragmentary section as seen along the line 2–2 on FIG. 1.
Figure 3:
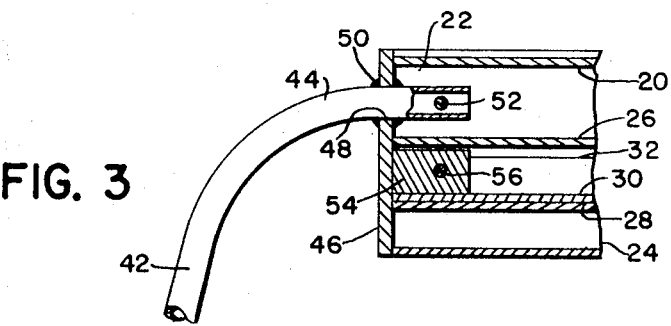
FIG. 3 is a further enlarged fragmentary section as seen along the line 3–3 of FIG. 2.

The vehicle chosen for purposes of illustration is a specially constructed tractor having a fore-and-aft main frame 10 including opposite or front and rear ends, the identification of which is determinable by noting that the arrow 12 indicates the normal direction of travel. The basic structure of the tractor is such that it is higher than the usual agricultural tractor so as to clear growing row crops, which is generally conventional construction.

The frame is carried on front and rear wheels 14 and 16, the former of which is steerable from an operator's station 18.

The frame includes a pair of elevated, fore-and-aft side members 20, here of tubular construction and each having a rear open end 22. Each side member is augmented by a channel 24 which lies alongside the member and which has such vertical dimension as to depend considerably below the member and thus to conceal the structure (to be described) behind the member. Each member thus has an under portion 26 spaced vertically above the inturned lower edge of the channel 24 and, spaced below this under portion, is a rail 28 which cooperates with a similar rail or angle 30 that forms a support along one fore-and-aft side of a tank or receptacle 32, it being understood that the opposite side of the tank has a similar rail 30. In the case of an agricultural crop sprayer, the tank may contain a suitable liquid solution and may be filled via a removable top cover 34.

Because of the fore-and-aft disposition of the rails 28 and 30, the tank may be easily installed from the rear of the vehicle by starting the tank rails 30 on the rear ends of the member rails 28 and pushing the tank forwardly, which eliminates the need for overhead hoists and the like. The tank in its installed or forward condition abuts a suitable frame part as at 36, and it remains only to confine the tank against rearward displacement. The novel means provided for this and other purposes includes an operator-mountable step means 38 at the rear of the vehicle. This means includes a lower step 40 which engages a lower rear portion of the vehicle from the rear and a pair of generally vertical handrails 42, each of which has an upper forwardly curved terminal portion 44 including means for preventing or blocking the tank against rearward displacement. The step 40 enables the operator not only to mount the vehicle but gives him a suitable vantage point from which to inspect the liquid level of the tank via the cover 34.

The tubular nature of each side member 20 and the space between its under portion 26 and the rail means 28—30 provides rear open ends closable by blocking or plate means 46 on the terminal end 44 of each handrail 42 and engageable from the rear with the associated tank rail 30. In each case, the plate is apertured at 48 and the terminal end projects through the aperture and is rigidly secured to the plate around the aperture as by welding at 50. Further, the terminal end projects within the rear end of the associated side member and is thus adapted to receive a cross fastener such as a bolt 52. Additionally, each plate 46 has rigid thereon a lower forward projection 54 that fills the gap between the rear part of the under portion 26 of the side member 20 and the associated rail means 28—30. Each projection may be tapped to receive a further fastener in the form of a capscrew 56 passed through suitable openings in the side member and its channel 24. This structure is of course repeated at the opposite side of the vehicle and the step means 38 is rigidly but removably mounted and contributes to the ease of mounting and dismounting of the tank.

I claim:

1. In a vehicle having a fore-and-aft main frame having front and rear ends and including transversely spaced-apart fore-and-aft members respectively having terminal ends at one of said main frame ends and a receptacle receivable between said members, the improvement comprising support means at opposite fore-and-aft sides of the receptacle for respectively engaging and resting on the members so that the receptacle can be mounted on the member ends and moved lengthwise of the frame toward the other end thereof for installation in the frame, and operator-mountable step means carried at said one end of the frame and including releasable frame-connected securing means including portions blocking the member ends and receptacle supports to prevent opposite lengthwise removal of the receptacle from the frame.

2. The invention defined in claim 1, in which the receptacle has an elevated top and the step means provides access to said top, and said step means includes laterally spaced handrails having upper parts secured to said members and said upper parts include said blocking portions.

3. The invention defined in claim 2, in which the members are tubular and said terminal ends are open and the upper parts of the handrails include elements respectively closing said open ends.

4. The invention defined in claim 3, in which each element is a transverse plate having an aperture therein and each handrail has a terminal portion entering the associated aperture.

5. The invention defined in claim 4, in which each terminal portion is rigidly secured to its plate about the aperture.

6. The invention defined in claim 5, in which each terminal portion projects through its aperture and is received within the associated member and a cross fastener is engaged between each member and the associated received terminal portion.

7. The invention defined in claim 1 in which each member has a fore-and-aft under portion and carries a fore-and-aft rail spaced below the under portion for receiving the associated member, and the block portions respectively include projections received respectively between the under portions and the receptacle supports.

8. The invention defined in claim 7, in which the members are tubular and said terminal ends are open and the upper parts of the handrails include elements respectively closing said open ends and also carrying said projections.

9. The invention defined in claim 8, in which each element is a transverse plate having an aperture therein and each handrail has a terminal portion entering the associated aperture.

10. The invention defined in claim 9, in which each terminal portion is rigidly secured to its plate about the aperture.

UNITED STATES PATENT OFFICE
CERTIFICATE OF CORRECTION

Patent No. 3,588,136   Dated 28 June 1971

Inventor(s) Francis Edward Schlueter

It is certified that error appears in the above-identified patent and that said Letters Patent are hereby corrected as shown below:

Column 2, line 59, after "associated" insert -- receptacle support also in spaced relation below the associated --.

Signed and sealed this 11th day of January 1972.

(SEAL)
Attest:

EDWARD M. FLETCHER, JR.            ROBERT GOTTSCHALK
Attesting Officer                  Acting Commissioner of Patents